Sept. 2, 1969 C. H. STAPPER, JR 3,465,322

TRANSDUCER UTILIZING ELECTRO-OPTIC EFFECT

Filed June 20, 1966 2 Sheets-Sheet 1

INVENTOR

CHARLES H. STAPPER JR.

BY Robert Lieber

ATTORNEY

United States Patent Office 3,465,322

Patented Sept. 2, 1969

3,465,322
TRANSDUCER UTILIZING ELECTRO-OPTIC EFFECT

Charles H. Stapper, Jr., Fridley, Minn., assignor to International Business Machines Corporation, Armonk, N.Y. a corporation of New York Filed June 20, 1966, Ser. No. 558,952
Int. Cl. G11b 5/00
U.S. Cl. 340—174.1 15 Claims

ABSTRACT OF THE DISCLOSURE

The disclosed transducer converts signals stored on a magnetic medium into corresponding electrical signals by the Faraday electro-optic effect. In one embodiment the transducer is a transparent thin film of magnetically sensitive material formed on a glass supporting substrate. The transducer is mounted with its edge adjacent the transport path of a magnetic record medium. Polarized light directed through the transducer film and glass substrate is additionally polarized according to the induced magnetic condition of the film. In another embodiment the transducer is a similarly interactive slab of transparent crystalline material. The first embodiment provides only a binary output, due to the nonlinear hysteresis responsive characteristic of the film, while the crystal of the second embodiment has a linear response which yields output light polarization variations more closely matched to the recorded magnetic signals.

Figure 1:
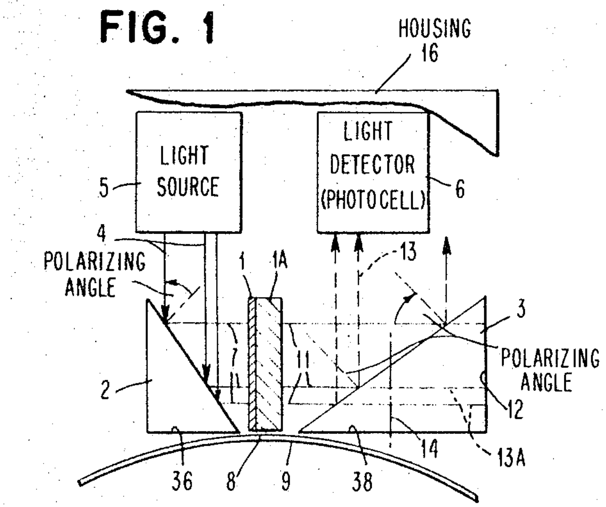

This invention is directed to a transducer utilizing an electro-optic effect for reading information on magnetic records.

Transducers are known which make use of the Kerr light polarization effect associated with light reflected from a magnetized surface. A disadvantage of this effect is that when reading highly concentrated information the light beam must be accurately focused and aligned and the reflected light must be received with great precision if there is to be accurate reproduction of the magnetically recorded information.

A more intensive light polarization effect, not known to have been previously adapted for practical use in the reproduction of information stored on magnetic records, is the Faraday effect. This effect relates to polarization of light transmitted through a transparent medium composed of ferromagnetic material or the like in the presence of a magnetic field. The present invention incorporates the Faraday effect in a transducing device which enjoys all of the advantages previously associated with other light actuated devices, while avoiding disadvantages usually associated with the other devices.

It is accordingly a primary object of this invention to provide light responsive transducer apparatus of improved design for reproducing information stored on a magnetic record which may be positioned entirely separate from the actual transducer apparatus.

Another object is to provide accurate, rugged, and efficient magneto-optic transducer apparatus utilizing a Faraday magneto-optic effect to reproduce information recorded on a magnetic medium which is physically separate and distinct from the apparatus.

A feature of the invention resides in the provision of a magneto-optic transducer arrangement in which polarized light is directed through a thin transparent film of homogeneous magnetic material, the latter positioned at an angle to a path traversed by the record surface of a magnetic recording medium such as tape. In passing through the film the light is subject to variable Faraday effect polarization depending upon a magnetic vector component at a point on the surface of a record medium adjacent the film. This variable polarization is distinguished as an indication of the intelligence stored at the said point. As the record is moved relative to the film a photoelectric light receiving element acts to reproduce the information stored in magnetic form on the record. Brewster prisms are situated on either side of the film. The prism which delivers light to the film polarizes the light in a unique sense and the other prism alternately reflects or absorbs light emerging from the film depending upon the condition of magnetization of the film. Thus a photoelectric element in the reflection path of the second prism responds variably to the magnetization of the film.

Since the magnetization induced in the film is independent of the rate of motion of the record medium, the resulting effect at the light receiver is also independent of such motion and can therefor be used to statically indicate the condition at a point in the record medium as well as to dynamically reproduce conditions stored in a length of track on the record medium.

Thus, the device of the present invention can provide high resolution electrical reproduction of magnetically recorded signals without complicated light focussing elements and without exacting geometric specifications to avoid interference between reflected and transmitted light waves. It should be noted also that since the Faraday effect is known to be decidedly stronger in intensity than the Kerr effect the signals obtained from the subject device are apt to be of greater fidelity than signals provided by comparable Kerr effect devices.

Because of its resemblance in function and application to ordinary magnetic transducers which operate by inductive coupling between a record medium and wires the apparatus of the present invention may easily be adapted to reproduce records made by more conventional recording systems; for example records on present day commercial magnetic tapes. The economic disadvantages accompanying total obsolescence of record equipment will be readily understood.

Thus another object of the invention is to provide novel magnetic transducer apparatus capable of providing an improvement in performance both in quality and resolution over more conventional apparatus based on direct inductive coupling between a record medium and an electrical system and yet capable of being easily adapted for use with conventional record media so that the latter are not rendered completely useless or obsolete by the introduction of the improved apparatus.

Figure 2:
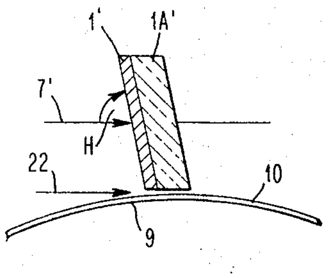
Figure 4:
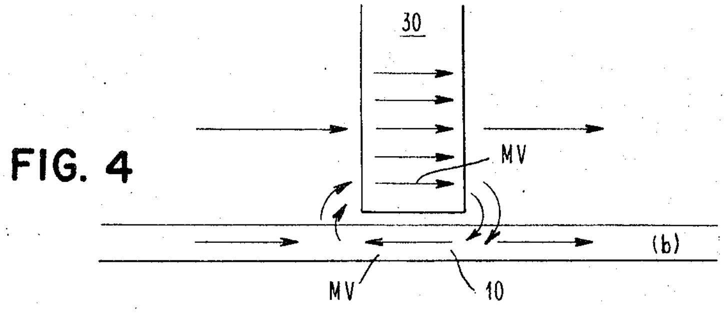
Figure 3:
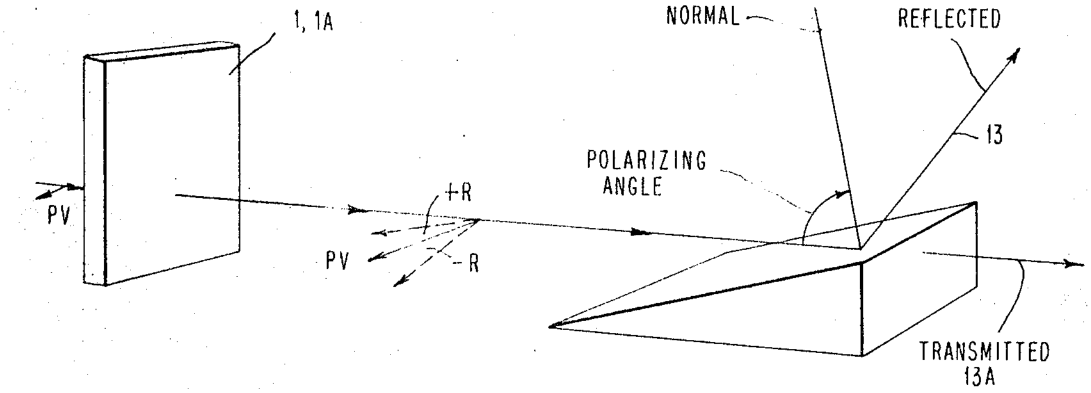
Figure 5:
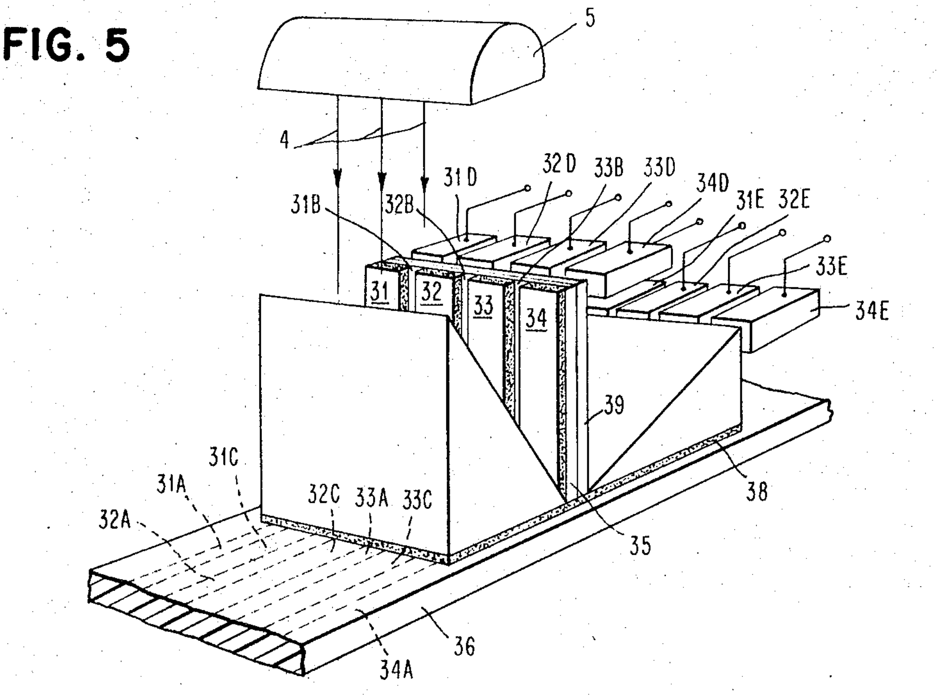

The foregoing and other objects and features of the invention will become apparent to those skilled in the art when considered in reference to the following detailed description and accompanying drawing, the latter including: FIG. 1 which is a partially schematic view of one form of my invention; FIG. 2 which illustrates an advantageous angular disposition of the sensing film in the invention shown in FIG. 1; FIG. 3 which illustrates in an exploded partially schematic perspective view the effect produced on transmitted light by the arrangements of FIGS. 1 and 2; FIG. 4 which illustrates an alternative use of a gadolinium iron garnet crystal as a transfer medium between the magnetic record and the optical system; FIG. 5 which illustrates in an exploded partially schematic perspective view a multiple track reproducing system embodying the present invention; and FIG. 6 which illustrates a refinement of the arrangement of FIGS. 1 and 2 adapted to provide light or no light at the light detector in accordance with the magnetic polarization on a record medium adjacent the transfer film.

The invention illustrated schematically in FIG. 1 provides record sensing apparatus which includes light transparent magnetically permeable film 1 disposed on a substrate 1A of glass, quartz, or other transparent and nonmagnetic material. Film 1 is composed of a magnetically sensitive material such as Permalloy (80% Ni and 20% Fe.) Entry and exit polarizing prisms 2 and 3, respectively, disposed on either side of the film and supporting substrate (1, 1A), direct monochromatic parallel rays of light 4 from a source 5 through the film and substrate (1, 1A) to a light receiving unit 6 such as a photocell or photodiode or photo transistor. It will be understood from the following discussion that in many applications mirrors may be used in place of prisms. Light 4 is incident on the surface of the prism 2 at approximately 56° to the normal to that surface, which angle is sometimes referred to as the polarizing or Brewster angle, and as a result the light 7 leaving prism 2 is plane polarized in a unique sense. This light passes through the transparent film 1, undergoes additional polarization due to the Faraday effect resulting when the edge 8 of the film is positioned adjacent the surface of a magnetic storage medium such as the surface 9 of magnetic tape 10, and then impinges on prism 3 again at the polarizing angle relative to the normal to the prism surface. Thus, the incident polarized light 11 will be more or less reflected from or absorbed by the prism 3 depending upon the degree of rotation of the polarization vector out of the plane of incidence (refer, for example, to "Fundamentals of Optics," third edition, Jenkins and White, chapter 24, p. 489 et seq., McGraw-Hill, 1957). The back surface 12 of prism 3 may be coated with a light absorbing black paint to absorb light transmitted through the prism.

With the edge of the film 1 adjacent a flux reversal orbit boundary on the record 10 a region of the film 1 will be nonlinearly driven to magnetic saturation in one or another stable position of its hysteresis curve depending on the magnetic polarity at the record. Accordingly as suggested in FIG. 3 the light transmitted through film 1 will experience Faraday effect rotation (R) of the polarization vector (PV) in one direction (−R) or the opposite direction (+R) depending upon the magnetic polarity of the film saturation. Those knowledgeable in the physics of optics will immediately recognize that without further adjustment a photocell placed at 6 will produce equal responses to the vectors +R and −R, since both vectors have equal absolute displacements relative to the plane of incidence to prism 3 defined by the plane of the drawing. Hence it is necessary to modify the relative positions of the +R and −R displacements by introducing an additional constant rotation of the polarization vector or the plane of incidence or both. Such rotation preferably should be of sufficient magnitude to position both the +R and −R vectors in the same 90° quadrant of rotation relative to the plane of incidence; thereby assuring a photo-electric response proportional solely to the Faraday effect caused by the film 1.

If desired, the coating of the back surface 12 of prism 3 may be eliminated and another light detector (not shown) may be stationed to receive the light 13A transmitted through the prism 3 with vector rotation as explained above. Then the difference between the electrical outputs of the light detector 6 and the not shown light detector may be taken as representative of the information stored in the record 10.

Due to hysteresis effect the film 1 tends to retain its magnetic state while its edge is passing between point regions of flux reversal on the tape, or while held stationary intermediate such point regions. Thus the reproduced electrical signal is independent of the rate of motion of the record 10 and also to a great extent, of the density of flux reversals on the record. It is estimated that at the present state of the art of film deposition and light detection, record densities of one million bits per inch can be accurately resolved and reproduced by the arrangement of FIG. 1.

One method which may be used to rotate the vector PV into an appropriate relative orientation is to rotate prism 3 about a vertical axis 14, or equivalently modify the construction of the prism, so that light polarized in one sense (+R) by the information on record 7 produces a minimal effect at photocell 6 while light polarized in the opposite sense (−R) produces a relatively maximum effect. It has been established that an NiFe film such as 1,500 A thick, on a substrate 1A of glass or quartz, will be magnetized to saturation in one or another direction in its own plane by exceeding a very low coercive force on the order of 0.5 oersted, and that an angle of rotation of prism 3 exists at which no light will be received at 6 for one stable condition of saturation of the film. It has further been established that the light reflected to detector 6 for the opposite magnetization of the film produces a discrete and distinctive change in electrical output of the detector.

Another alternative would be to change the construction or relative orientation of the first prism 2 to position the vector PV at a suitable angle of incidence relative to prism 3.

Figure 6:
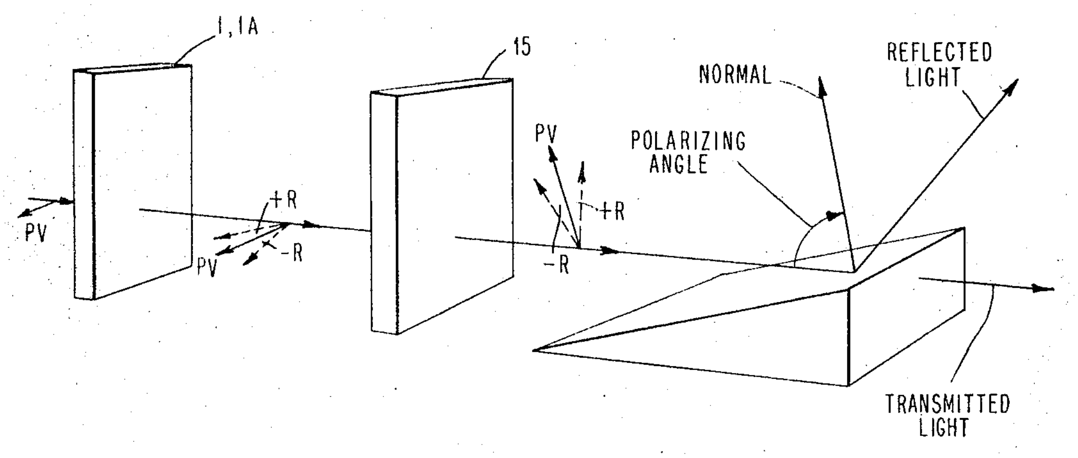

Yet another alternative shown in FIG. 6 is to station a wave plate 15 in the light transmission path to produce a constant rotation of the vector PV such that for one condition of magnetic saturation of the film 1 (corresponding to +R rotation) no light reaches detector 6. Then for the opposite condition of film 1 (corresponding to −R) a discrete maximal change in detector output will be observered.

It will be understood that for a sensitive film 1 interference from stray external magnetic fields should be avoided by a suitable housing shield as suggested at 16.

It has been established (note FIG. 2) that a more intense differential Faraday effect is achieved if the film 1 is stationed at an angle H other than 90° relative to the incident light 7′ and to the tangent 22 to the surface 9 of record 10. Satisfactory results can be obtained with the film 1 and substrate 1A′ (FIG. 2) inclined at an angle H of 60°, or even 45°, to the direction of propagation of the incident light 7′.

The transfer film 1 (1′) in FIG. 1 (2) is a sensitive to the magnetic record vector component parallel to its light transmitting surface. A Faraday effect transfer medium 30 sensitive to the magnetic vector MV perpendicular to its light transmitting surface is shown in FIG. 4. Such effects are produced for example by gadolinium iron garnet crystals. Present day garnets .001 inch thick will produce differences on the order of 15°, in the Faraday effect polarization of transmitted light. Record densities of one thousand bits per inch will be easily reproduced by the crystals. Since the crystal is not subject to nonlinear hysteresis effect and has a broad range of frequency response the Faraday polarization of the crystal can be made to follow and reproduce linear magnetic record variations such as are encountered for example in the reproduction of sound effects or of television images. Thus while perhaps not as effective as film for binary signal reproduction the crystal can be used where film would be ineffective.

To prevent stray reflections of light the undersurfaces of prisms 2 and 3 (36, 38, respectively, in FIG. 1) should be coated with a light absorbing layer of paint.

As shown in FIG. 5 a plural track system employing transfer films of the type shown in FIGS. 1 and 2 can be realized by depositing strips of ferromagnetic film 31, 32, 33, 34 on a glass or quartz substrate 35 and positioning the film strips over corresponding tracks 31A, 32A, 33A, 34A of a tape record such as 36. Spaces 31B, 32B, 33B between strips corresponding to intertrack spaces 31C, 32C, 33C on the record 36 may be coated with black paint to suppress undesired "cross-talk" due to stray light reflections. Light detectors 31D, 32D, 33D, 34D may be stationed to intercept light reflected from exit prism 38, and if desired other light detectors 31E, 32E, 33E, 34E can be stationed to intercept light transmitted through prism 38 for differential detection (difference between D and E electrical outputs). A wave plate 39 is used to rotate the polarization vector in each light "track" by a constant amount, as explained above, to produce photoelectric responses which accurately reproduce respective Faraday effects.

While the invention has been particularly shown and described with reference to particular tape transducing embodiments it will be understood by those skilled in the art that the invention can also be used to reproduce records on other magnetic media including, but not limited to, drums, discs, or plastic belts. It will also be appreciated that changes in details or packaging may be made herein without departing from the spirit and scope of the invention.

What is claimed is:

1. In a system for reproducing recorded information,
a homogeneous transparent member sensitive to magnetic fields,
means for directing light through said member,
means for positioning a record bearing surface of a record medium at an angle to said member in close proximity to an edge thereof, said surface bearing a record which provides an external magnetic field capable of varying a light transmission property of the member directly,
and means stationed to intercept light transmitted through said member in varying amounts in accordance with the condition of light transmission of said member.

2. In a system for converting information recorded on a magnetic medium into corresponding electrical signals, the improvement comprising:
a homogeneous transparent member having a light transmission property subject to modification by the Faraday effect,
means for transmitting light through said member,
means for moving a magnetic record medium relative to said member adjacent an edge of the member with a record bearing surface positioned at an angle other than 0 degree in relation to the light transmitting surface of said member; and
means variably responsive to the light transmitted from said member to produce variable electrical signals corresponding to the Faraday effect exerted by said medium on said member.

3. A system according to claim 2 in which said transparent member includes a film of magnetically permeable material exhibiting hysteresis.

4. A system according to claim 2 in which said transparent member comprises a crystal which exhibits Faraday effect rotation of a polarization vector associated with said light in response to magnetic fields having a component directed at an angle other than 0° relative to the light transmitting surface of said crystal.

5. In a system for converting signals recorded in magnetic form into corresponding electrical signals:
a nonmagnetic transparent supporting substrate;
a ferromagnetic transparent film deposited on a surface of said substrate;
a source of light;
means including a polarizing prism for directing polarized light from said source through said film and substrate;
means including another polarizing prism for collecting light transmitted through said film and substrate with the polarization vector of said light offset to define unequal supplementary displacement angles relative to the plane of incidence in which polarized light would be fully absorbed by said another prism;
means for transporting a record member through a predetermined path; and
means stationing said film and substrate with abutting edges thereof in close proximity to a portion of said path and with the light transmitting surfaces thereof offset at an angle to said path.

6. A system according to claim 5 in which:

record members handled by said transporting means are provided with a plurality of tracks of magnetically recorded information;
said film includes a number of separated strip sections disposed to coact with respective tracks; and
said light collecting means includes individual light detecting elements for individually detecting the light transmitted through respective strip sections of the film.

7. A magneto-optic transducer comprising first, second and third light transmission paths, first reflecting means having a surface stationed to receive light from said first path at a polarizing angle of incidence and to reflect polarized light having an associated constant poralization vector into said second path;
second reflecting means adapted to receive light from said second light transmission path at a polarizing angle of incidence with said constant polarization vector unsymmetrically offset from a plane of incidence associated with complete light absorption and to reflect light having said constant vector with said offset from said second path into said third path;
a transparent member stationed in said second path to intercept and transmit light traversing said second path and to exert a variable Faraday polarizing effect on said offset of said polarization vector in response to magnetic fields extending into said second path to thereby vary the said portion of light reflected into said third path;
and photoelectric transducing means stationed to receive light in said third path.

8. A transducer according to claim 7 including a wave plate stationed in said second path for exerting a predetermined constant rotational effect on the polarization vector associated with light traversing said second path, such that for one predetermined condition of Faraday effect polarization produced by said member the offset light polarization vector is directed parallel to the plane of incidence, whereby the intensity of light reflected to said photoelectric detecting means is reduced substantially to minimum null level.

9. A transducer according to claim 7 wherein said member comprises a transparent supporting substrate bearing a thin film of ferromagnetic material on one surface thereof stationed at an angle other than zero degrees in relation to the direction of propagation of light through said second path, said film exhibiting nonlinear hysteresis effect as well as correspondingly nonlinear Faraday effect in response to externally applied magnetic fields.

10. A transducer according to claim 9 in which the said second reflecting means is a prism, and including a fourth light transmission path aligned with an extension of the said second path through the said prism, with second photoelectric transducing means stationed in said fourth light transmission path to receive light therefrom to enable comparison to be made of light intensities in said third and fourth paths.

11. A transducer according to claim 7 wherein said transparent member comprises a gadolinium iron garnet crystal responsive to variable magnitude magnetic field vector components extending in a direction transverse to the light transmitting surface thereof to exert variable Faraday polarization effect on said light which corresponds in both magnitude and polarity to the magnitude and polarity of said vector component.

12. In a magneto-optic transducing system a source of parallel monochromatic light of constant intensity;
a first polarizing prism stationed in the path of light rays emitted from said source to receive said light at a polarizing angle of incidence and to reflect said light in a predetermined direction;
a transparent member positioned at an angle other than zero degree in relation to said predetermined direction and stationed to receive and pass light propagating in said predetermined direction;

at least a portion of said member comprising a material capable of exerting a variable Faraday polarization effect on light transmitted therethrough in response to external magnetic fields;

a second polarizing prism stationed to receive light emitted in said predetermined direction from said member at a polarizing angle of incidence and to reflect a portion of the light energy received thereby in a second predetermined direction;

said portion of reflected light energy being proportional to the Faraday effect exerted by said member;

and light detecting means stationed to intercept light propagating in said second predetermined direction and to produce corresponding electrical output signals.

13. In a system according to claim 12 means for moving a magnetic surface bearing a record of binary magnetic variations thereon in proximity to an edge of the said transparent member.

14. In a system according to claim 13 said transparent member comprising a film of ferromagnetic material having magnetic properties similar or identical to Permalloy (80% Ni and 20% Fe) supported on a glass or quartz substrate, said film being driven between first and second predetermined stable positions on a hysteresis curve by the binary magnetic conditions on said record;

said system including means such as a wave plate for exerting a predetermined rotational effect on the polarization vector of light propagating between said first and second prisms such that for one stable hysteresis condition of said film the intensity of light reflected from said second prism is reduced to a relatively null or minimum level.

15. In a system according to claim 12 said angle of said member being other than 90° in relation to said predetermined direction.

References Cited

UNITED STATES PATENTS

| | | | |
|---|---|---|---|
| 2,560,430 | 7/1951 | Friend | 179—100.2 |
| 2,984,825 | 5/1961 | Fuller et al. | 340—174.1 |
| 2,947,212 | 8/1960 | Woods | 88—14 |
| 2,987,249 | 6/1961 | Vechren | 340—174.1 |
| 3,148,354 | 9/1964 | Schaffert | 340—173 |
| 3,171,754 | 3/1965 | Smaller | 340—174.1 |
| 3,196,206 | 7/1965 | Griffiths | 340—174.1 |
| 3,228,015 | 1/1966 | Miyatz et al. | 340—174.1 |
| 3,229,273 | 1/1966 | Baaba et al. | 340—174.1 |
| 3,353,894 | 11/1967 | Harris | 340—173 |

BERNARD KONICK, Primary Examiner

VINCENT P. CANNEY, Assistant Examiner

U.S. Cl. X.R.

88—14; 179—100.2; 350—151